US012706748B2

(12) United States Patent
Le Saint

(10) Patent No.: US 12,706,748 B2
(45) Date of Patent: Aug. 11, 2026

(54) AUTHENTICATION PROXY FOR PASSWORD ROTATION

(71) Applicant: Visa International Service Association, San Francisco, CA (US)

(72) Inventor: Eric Le Saint, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 66 days.

(21) Appl. No.: 18/678,062

(22) Filed: May 30, 2024

(65) Prior Publication Data

US 2025/0373435 A1 Dec. 4, 2025

(51) Int. Cl.
*H04L 9/32* (2006.01)

(52) U.S. Cl.
CPC .................................. *H04L 9/3226* (2013.01)

(58) Field of Classification Search
CPC ..................................................... H04L 9/3226
See application file for complete search history.

(56) References Cited

U.S. PATENT DOCUMENTS 10,616,196 B1 * 4/2020 Khitrenovich ......... G06N 20/00
2007/0220009 A1 * 9/2007 Morris ................ G06F 21/6218
2010/0199336 A1 * 8/2010 Tan ....................... H04L 9/3228 726/6
2015/0149766 A1 * 5/2015 Shukla ................ H04L 63/0815 713/155
2022/0174061 A1 * 6/2022 Chitkara ............... H04L 9/3228

* cited by examiner

*Primary Examiner* — Henry Tsang
(74) *Attorney, Agent, or Firm* — K&L Gates LLP

(57) ABSTRACT

Disclosed is a method, system, and computer program product for rotating a password. According to the method, a proxy server receives a first service ID password from an application server. The proxy server determines whether to use the first service ID password to authenticate the application server at an authentication service based on a query of a database of password changes. Based on the determination of whether to use the first service ID password, the proxy server authenticates the application server at the authentication service using the first service ID password based on the determination or authenticates the application server at the authentication service by replacing the first service ID password with a second service ID password based on the determination.

20 Claims, 8 Drawing Sheets

AUTHENTICATION PROXY FOR PASSWORD ROTATION

TECHNICAL FIELD

In one general aspect, this application is related credential or password rotation in the realm of cybersecurity. More particularly, this application is related to an authentication proxy that handles the rotation of passwords in identity and access management (IAM) or privileged access management (PAM) systems to automate the process of rotating passwords for various accounts to enhance security by regularly changing credentials and reducing the risk of unauthorized access.

SUMMARY

In one aspect, the present disclosure provides a method for rotating a password. The method comprising: receiving, by a proxy server, a first service ID password from an application server; determining, by the proxy server, whether to use the first service ID password to authenticate the application server at an authentication service based on a query of a database of password changes; and one of: authenticating the application server at the authentication service using the first service ID password based on the determination; or authenticating the application server at the authentication service by replacing the first service ID password with a second service ID password based on the determination.

In another aspect, the present disclosure provides a system, comprising: a proxy server; a proxy registry database of password changes; and a authentication service; wherein the proxy server is configured to: receive a first service ID password from an application server; determine whether to use the first service ID password to authenticate the application server at the authentication service based on a query of the proxy registry database of password changes; and one of: authenticate the application server at the authentication service using the first service ID password based on the determination; or authenticate the application server at the authentication service by replacing the first service ID password with a second service ID password based on the determination.

In yet another aspect, the present disclosure provides a computer program product comprising at least one non-transitory computer-readable medium including one or more instructions that, when executed by at least one processor, cause the at least one processor to: receive a first service ID password from an application server; determine whether to use the first service ID password to authenticate the application server at an authentication service based on a query of a proxy registry database of password changes; and one of: authenticate the application server at the authentication service using the first service ID password based on the determination; or authenticate the application server at the authentication service by replacing the first service ID password with a second service ID password based on the determination.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
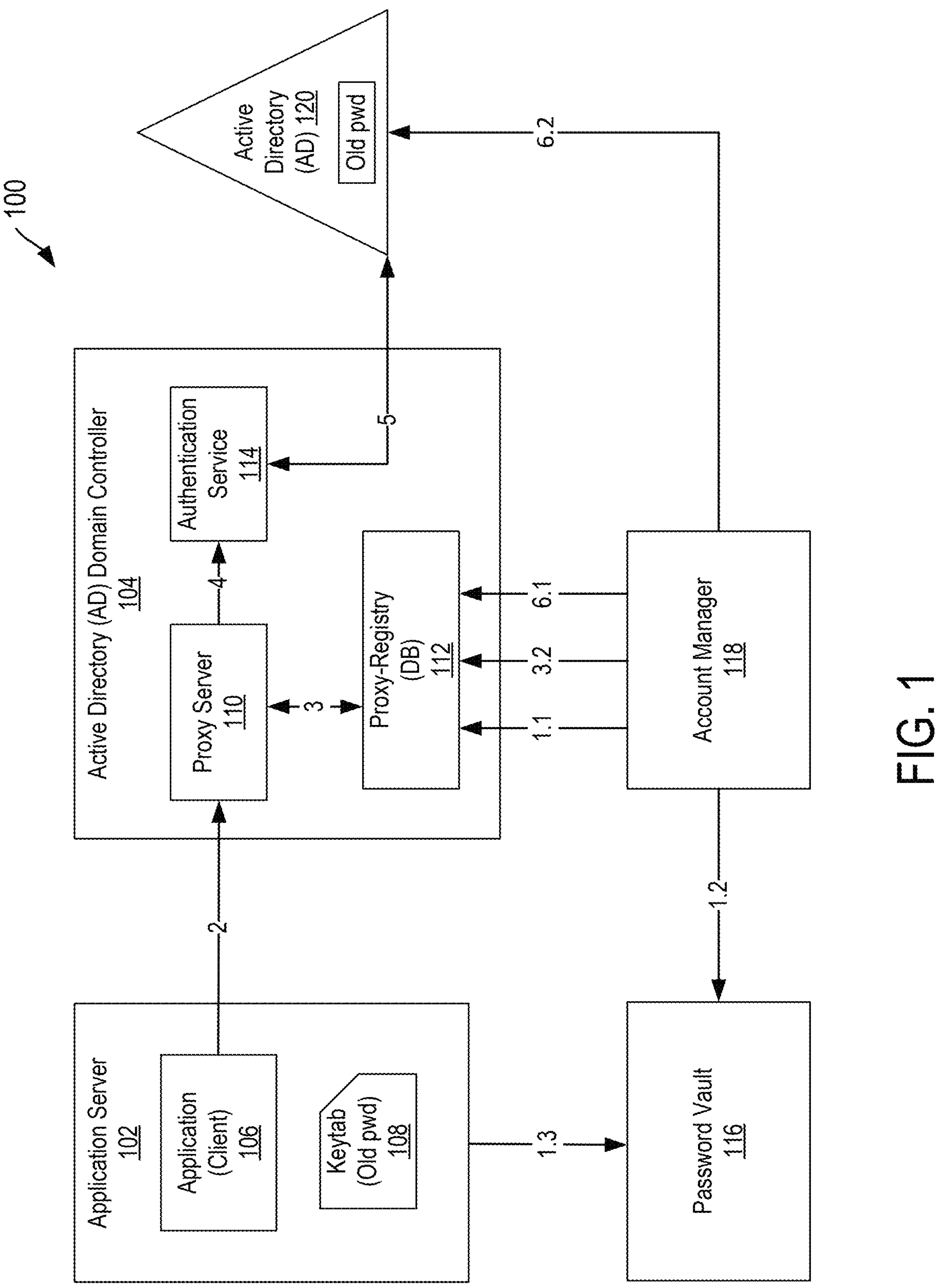

The [apparatuses, systems, and methods] disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates an authentication proxy system for password rotation, according to at least one aspect of the present disclosure.

Figure 2:
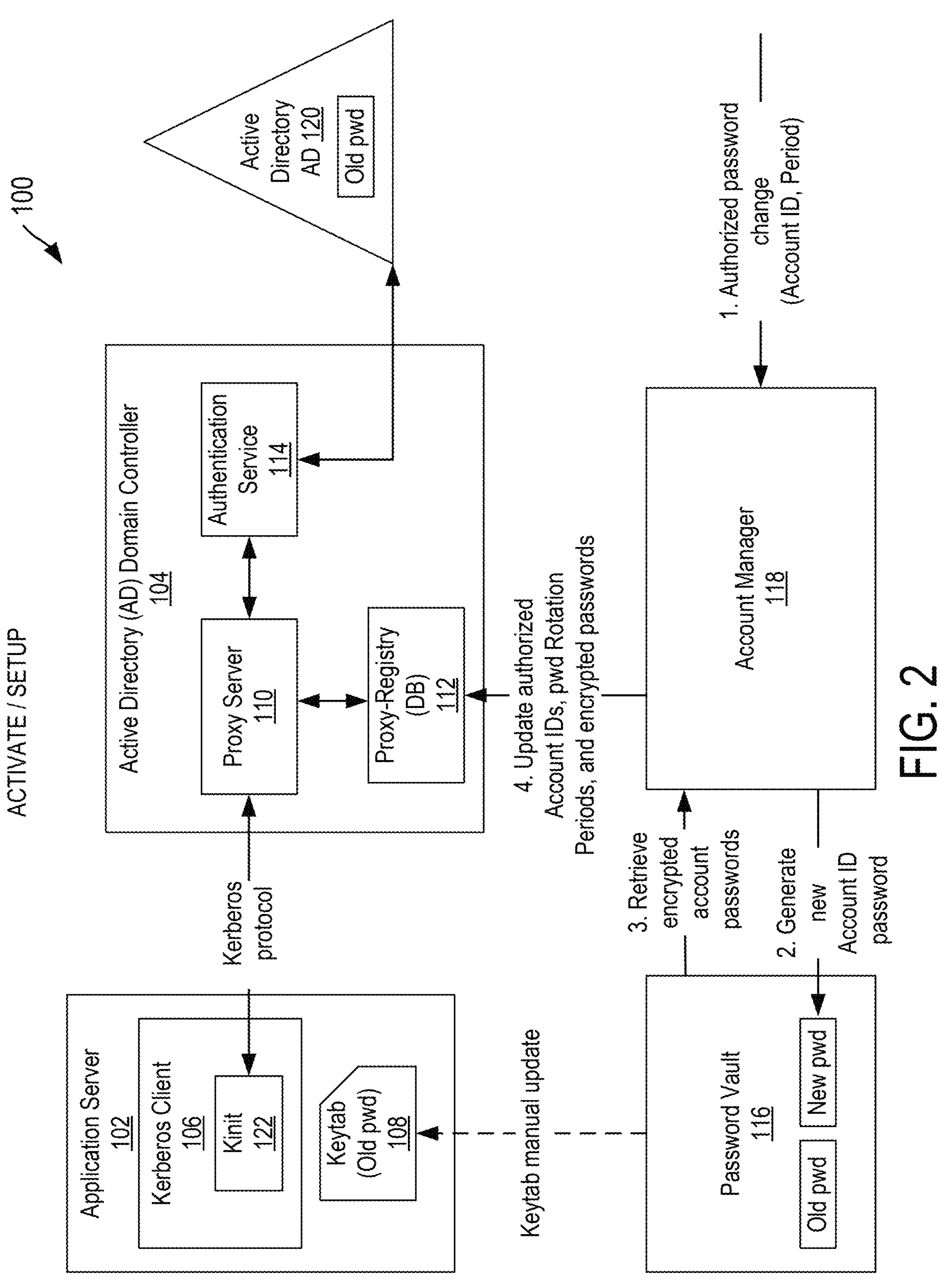

FIG. 2 illustrates an activate/setup phase of the authentication proxy system for password rotation shown in FIG. 1, according to at least one aspect of the present disclosure.

Figure 3:
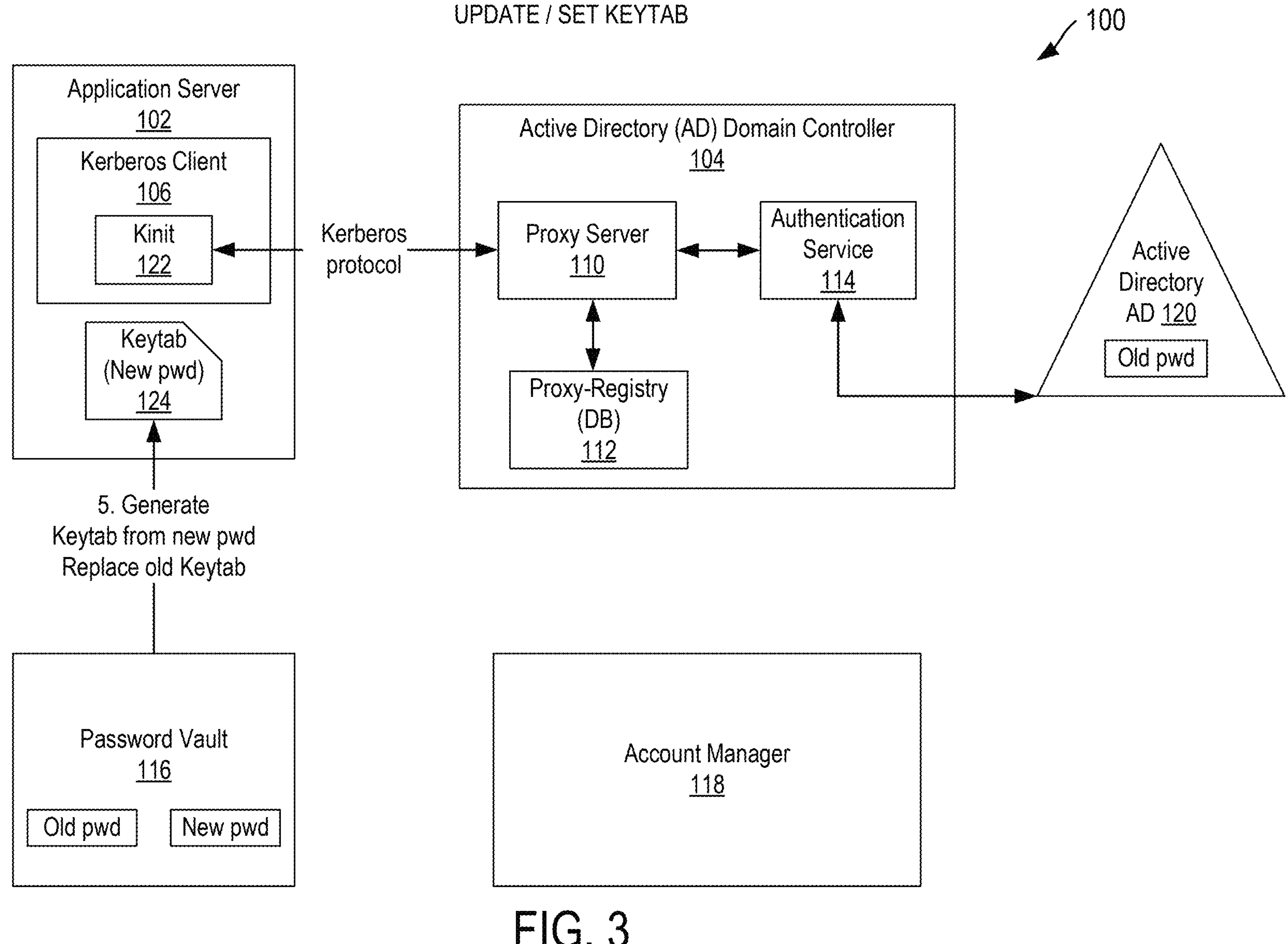

FIG. 3 illustrates an activate/setup Keytab phase of the authentication proxy system for password rotation shown in FIG. 1, according to at least one aspect of the present disclosure.

Figure 4:
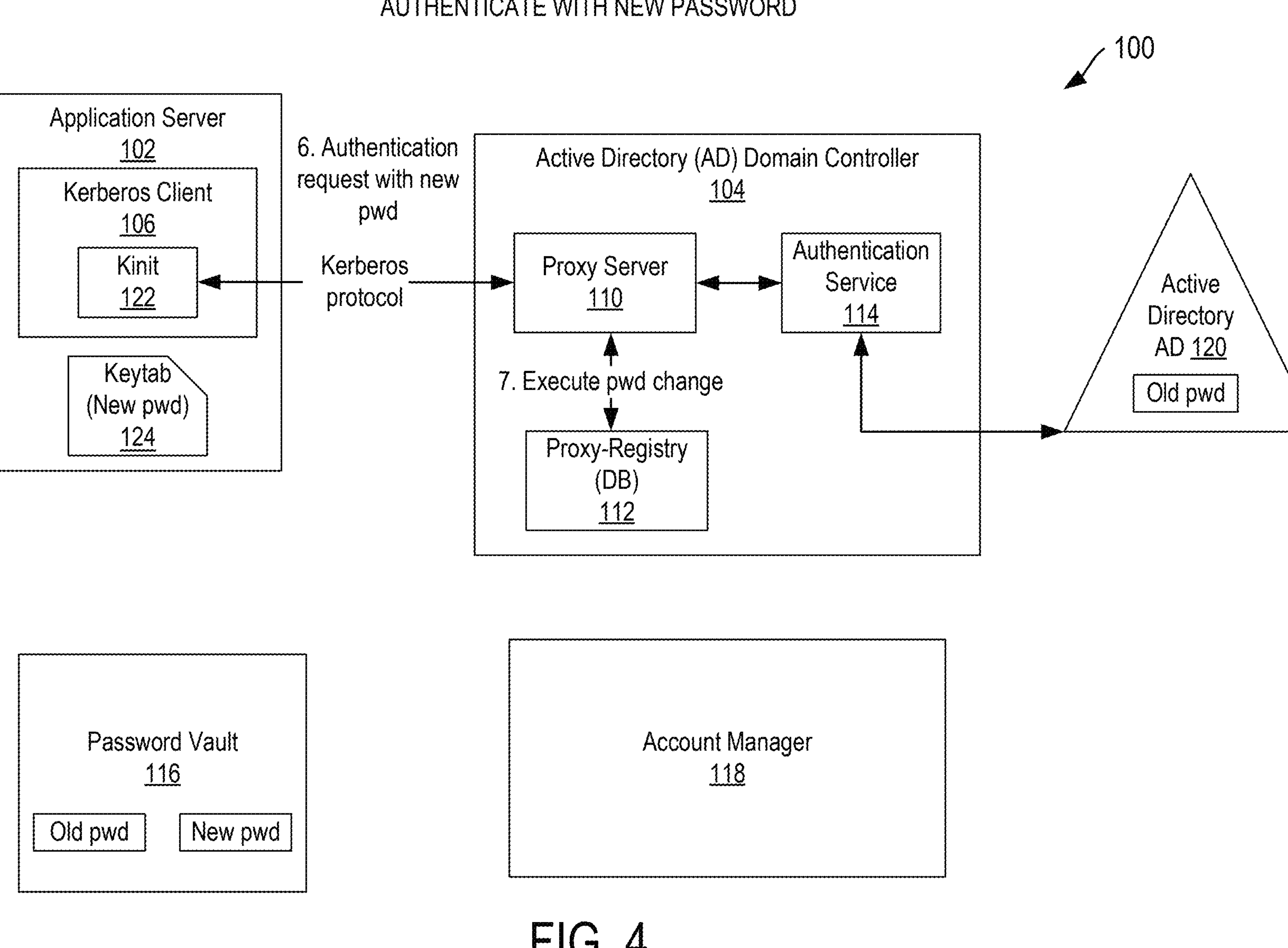

FIG. 4 illustrates an authenticate with new password phase of the authentication proxy system for password rotation shown in FIG. 1, according to at least one aspect of the present disclosure.

Figure 5:
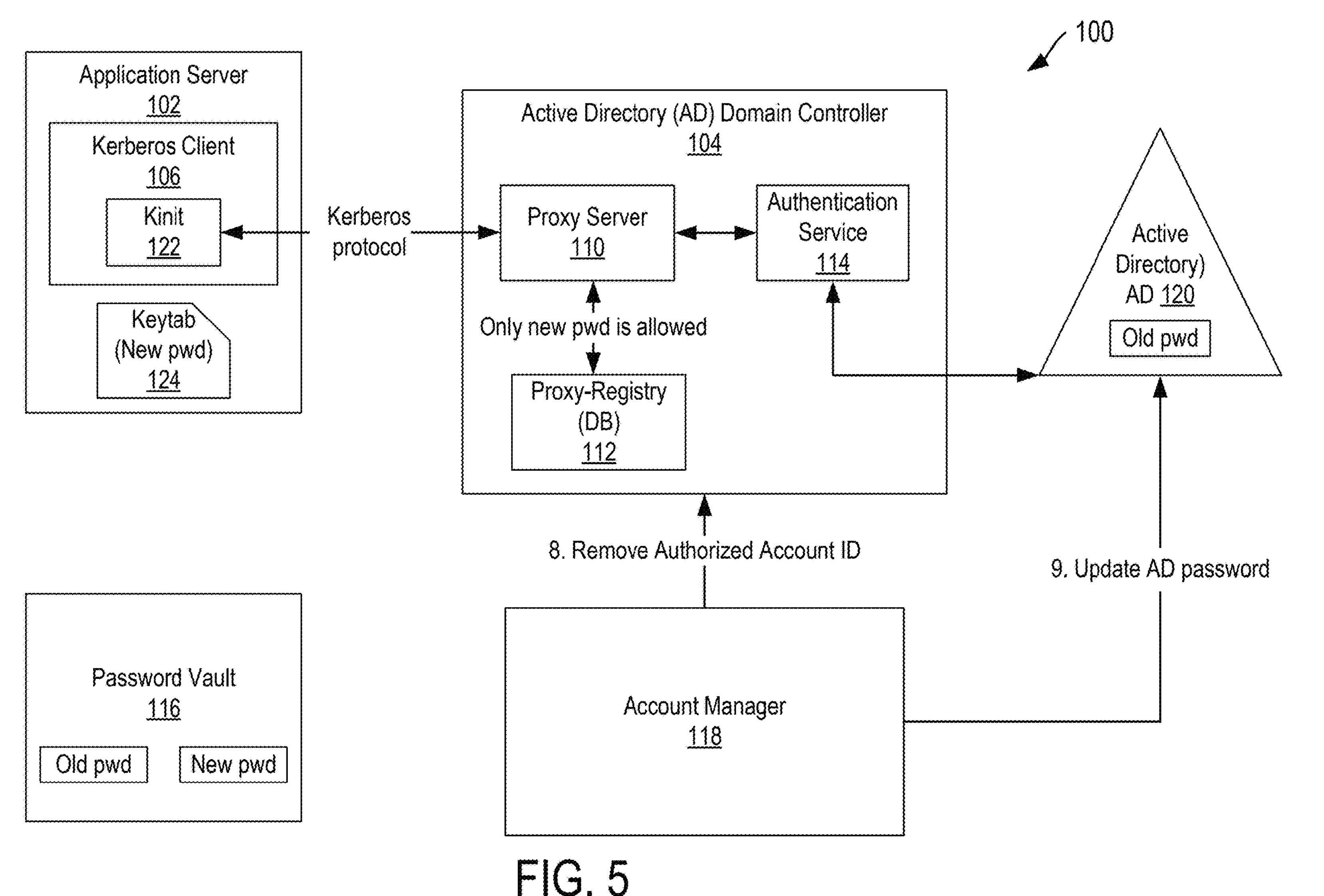

FIG. 5 illustrates a terminate password rotation period phase of the authentication proxy system for password rotation shown in FIG. 1, according to at least one aspect of the present disclosure.

Figure 6:
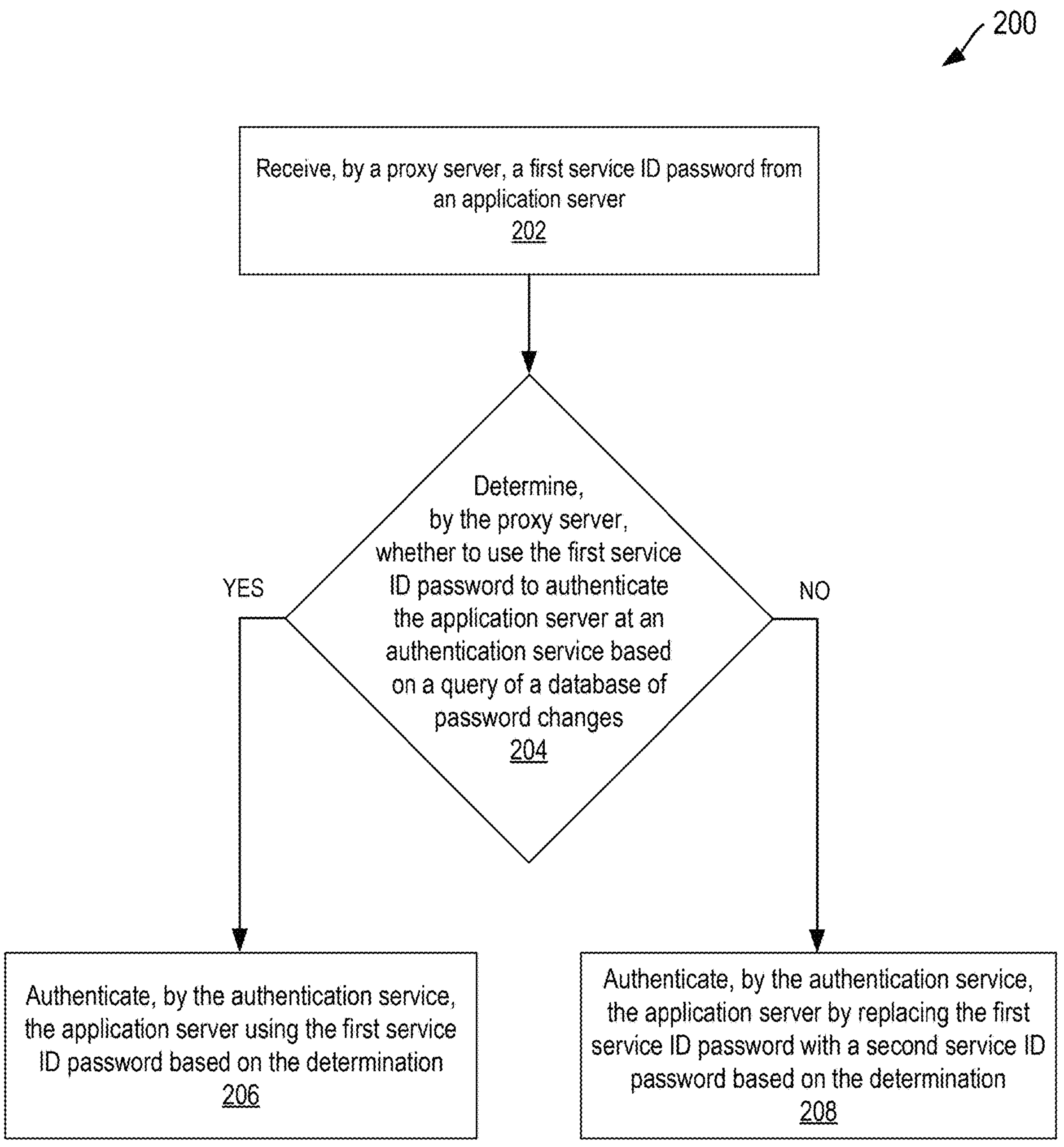

FIG. 6 illustrates a method for rotating a password executed on the authentication proxy system for password rotation shown in FIG. 1, according to at least one aspect of the present disclosure.

Figure 7:
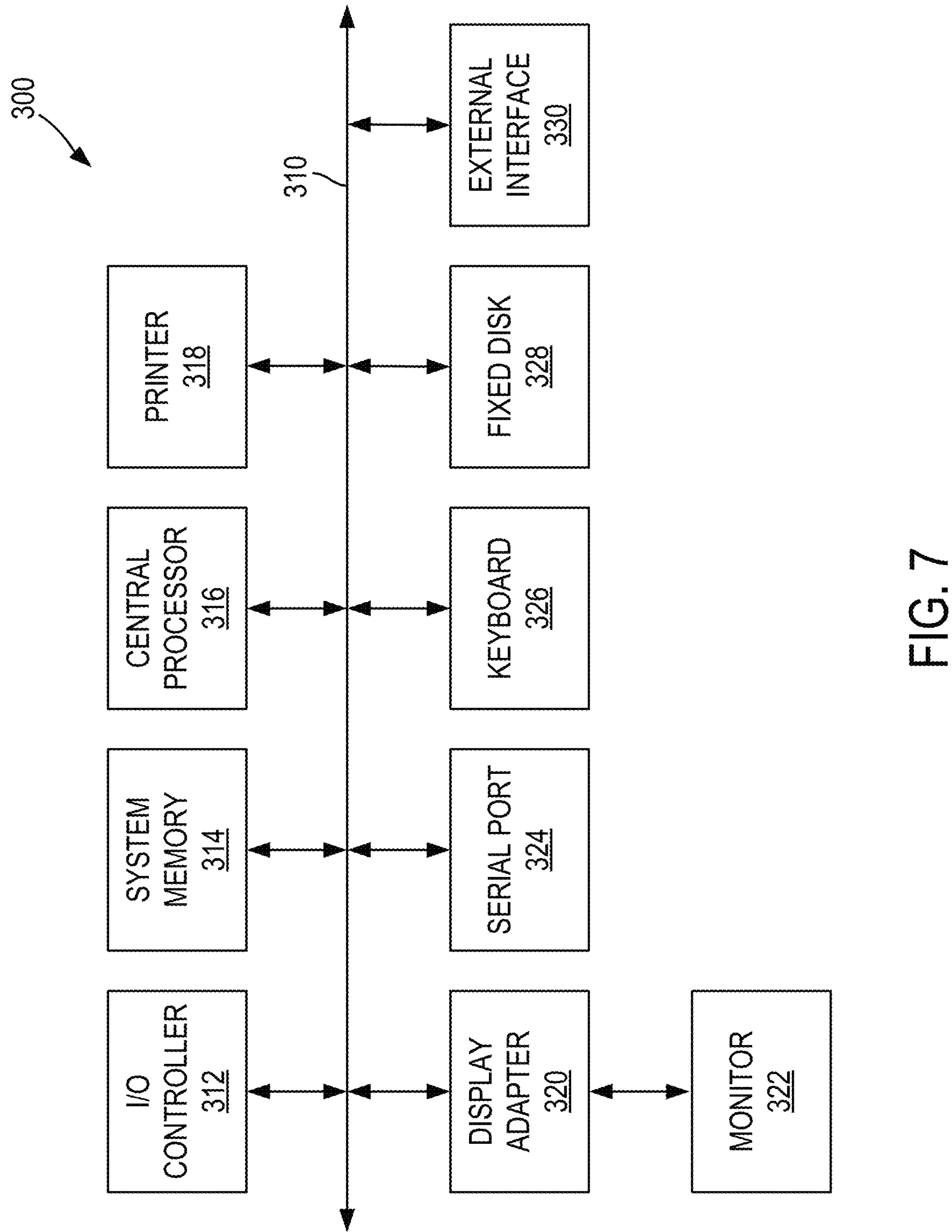

FIG. 7 is a block diagram of a computer apparatus with data processing subsystems or components, according to at least one aspect of the present disclosure.

Figure 8:
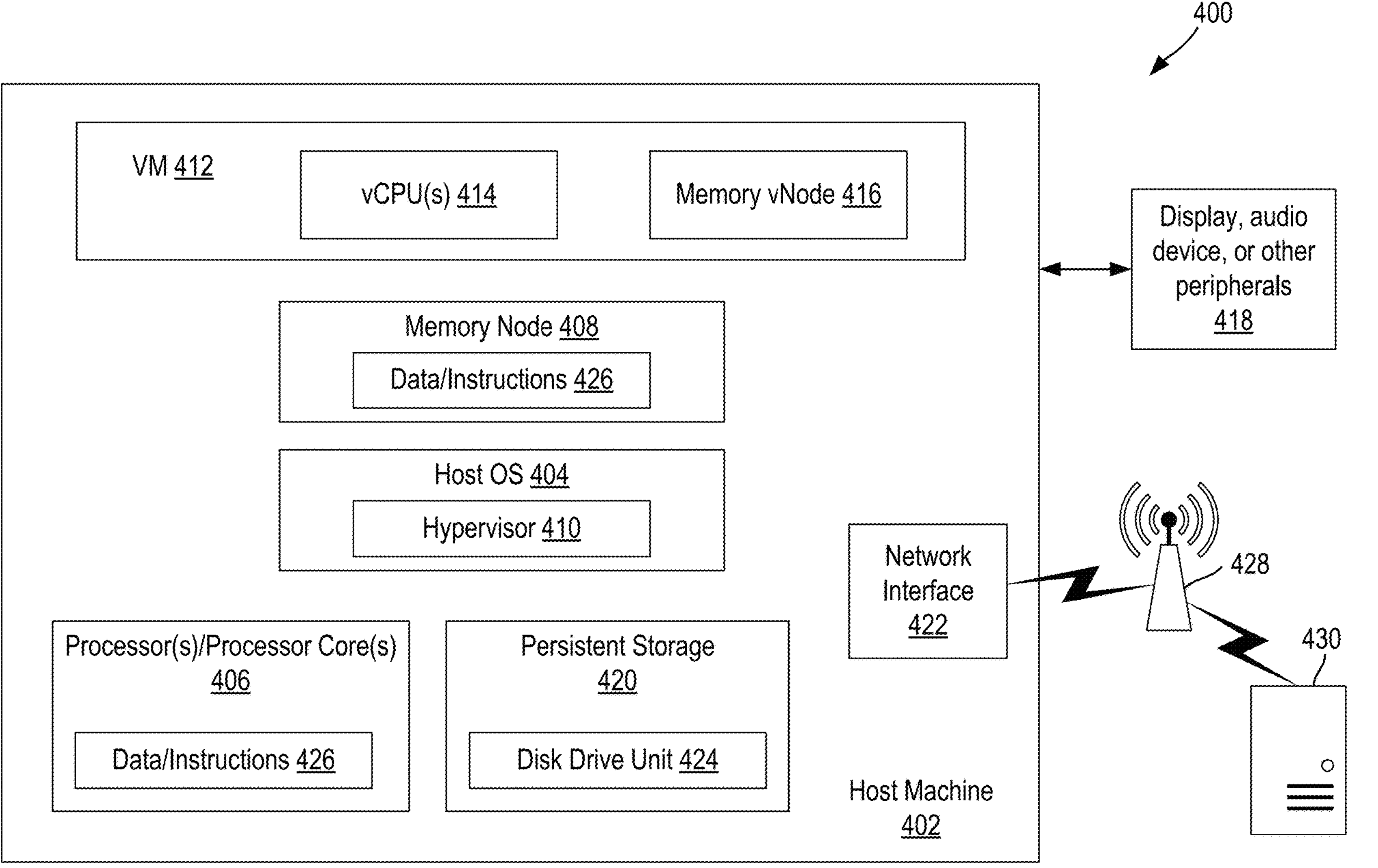

FIG. 8 is a diagrammatic representation of an example computer system that includes a host machine within which a set of instructions to perform any one or more of the methodologies discussed herein may be executed, according to at least one aspect of the present disclosure.

DESCRIPTION

The following disclosure may provide exemplary systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A “wallet application” may include a software module with similar functionality to a payment application that has multiple accounts provisioned or enrolled such that they are usable through the wallet application. Further, an “application” or “application program interface” (API) refers to computer code or other data sorted on a computer-readable medium that may be executed by a processor to facilitate the interaction between software components, such as a client-side front-end and/or server-side back-end for receiving data from the client. An “interface” refers to a generated display, such as one or more graphical user interfaces (GUIs) with which a user may interact, either directly or indirectly (e.g., through a keyboard, mouse, touchscreen, etc.).

An “application server” serves as a platform for running and managing applications. It handles tasks like application deployment, security, scalability, and data access. The relationship between an application server, an application, and client is like a bridge. The application server hosts and manages the application, providing services and resources to it. The application is a software program that performs specific tasks of functions, utilizing the services provided by the application server. A “client” interacts with the application server to access the application's functionality, typically through a user interface.

“Authentication” is a process by which the credential of an endpoint (including but not limited to applications, people, devices, process, and systems) can be verified to ensure that the endpoint is who they are declared to be.

As used herein, the terms “client” and “client device” may refer to one or more client-side devices or systems (e.g., remote from a transaction service provider) used to initiate or facilitate a transaction (e.g., a payment transaction). Moreover, a “client” may also refer to an entity (e.g., a merchant, an acquirer, and/or the like) that owns, utilizes, and/or operates a client device for initiating transactions (e.g., for initiating transactions with a transaction service provider).

The terms “client device” and “user device” refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the term “communication” and “communicate” may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

A “communication channel” may refer to any suitable path for communication between two or more entities. Suitable communications channels may be present directly between two entities such as a payment processing network and a merchant or issuer computer or may include a number of different entities. Any suitable communications protocols may be used for generating a communications channel. A communication channel may in some instances comprise a “secure communication channel” or a “tunnel,” either of which may be established in any known manner, including the use of mutual authentication and a session key and establishment of a secure communications session. However, any method of creating a secure communication channel may be used, and communication channels may be wired or wireless, as well as long-range, short-range, or medium-range. By establishing a secure channel, sensitive information related to a payment device (such as account number, CVV values, expiration dates, etc.) may be securely transmitted between the two entities to facilitate a transaction.

As used herein, the term “comprising” is not intended to be limiting but may be a transitional term synonymous with “including,” “containing,” or “characterized by.” The term “comprising” may thereby be inclusive or open-ended and does not exclude additional, unrecited elements or method steps when used in a claim. For instance, in describing a method, “comprising” indicates that the claim is open-ended and allows for additional steps. In describing a device, “comprising” may mean that a named element(s) may be essential for an embodiment or aspect, but other elements may be added and still form a construct within the scope of a claim. In contrast, the transitional phrase “consisting of” excludes any element, step, or ingredient not specified in a claim. This is consistent with the use of the term throughout the specification.

As used herein, the term “computing device” or “computer device” may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term “computer” may refer to any computing device that includes the necessary components to send, receive, process, and/or output data, and normally includes a display device, a processor, a memory, an input device, a network interface, and/or the like.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, a "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions and may also include multiple devices or components (e.g., when a device has remote access to a network by tethering to another device—e.g., using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

A "payment network" may refer to an electronic payment system used to accept, transmit, or process transactions made by payment devices for money, goods, or services. The payment network may transfer information and funds among issuers, acquirers, merchants, and payment device users. One illustrative non-limiting example of a payment network is VisaNet, which is operated by Visa, Inc.

A "payment processing network" may refer to a system that receives accumulated transaction information from the gateway processing service, typically at a fixed time each day, and performs a settlement process. Settlement may involve posting the transactions to the accounts associated with the payment devices used for the transactions and calculating the net debit or credit position of each user of the payment devices. An exemplary payment processing network is Interlink®.

A "processing network" may include an electronic system used to accept, transmit, or process transactions made by devices. The processing network may transfer information among transacting parties (e.g., issuers, acquirers, merchants, device users, etc.).

As used herein, the term "server" may include one or more computing devices which can be individual, standalone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a payment network, a financial institution, a healthcare provider, a social media provider, a government agency, or agents of any of the aforementioned entities. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support payment network cloud service.

As used herein, the term "system" may refer to one or more computing devices or combinations of computing devices (e.g., processors, servers, client devices, software applications, components of such, and/or the like).

In credential or password rotation in the realm of cybersecurity, the process of rotating passwords for various accounts in IAM or PAM systems utilizes a staging process to make global changes in production. Therefore, authentication services for validating service accounts with passwords, like Active Directory (AD), must be capable of accepting both new and old passwords during long password change periods that may last weeks or months until all service account passwords deployed in the domain have been updated with the new passwords. This is particularly difficult to solve for the Kerberos or Lightweight Directory Access Protocol (LDAP) authentication protocols.

Most applications use remote services for their operation. To access remote services such as, for example, a structured query language (SQL) database, an application utilizes a service account ID and a valid service account ID password. In a payment network environment, service accounts and their passwords may be managed within a global authentication service (e.g., Active Directory [AD]). Generally, for most authentication services there can be only one valid password version associated with the service account ID at a given time. Many applications may share the same service account ID. To allow resilience, applications access a single service account password from multiple application instances.

In a payment network environment, the Payment Card Industry (PCI) and Key Controls mandate that service account passwords are rotated periodically for data security protection.

When an application instance accesses a service account password from a local vault or cache, it is impractical to perform password rotation across all applications that also need that same password, without interrupting all instances of all applications until all changes are made. If any changes are not performed on any applications, the service account will be locked due to password validation failure.

For that reason, payment networks may employ a two-step change operation. First, a minimum number of application instances are enabled to rotate their service account password. Second, once the change is tested and successful, the password rotation change is made globally. The complete change period for password rotation is very long and may last multiple weeks or months, making it impracticable to implement efficiently.

Thus, there are technical challenges in configuring the authentication service to recognize both old and new passwords as legitimate throughout an extended password transition period. Following this period, the old password will be deemed compromised and ineligible.

While payment networks often mandate a Kerberos mechanism for password authentication to access non-web services, including Keytab files, a LDAP may still serve as a legacy alternative mechanism.

In one aspect, the present disclosure offers a software solution capable of interfacing with authentication services like Active Directory LDAP or Kerberos, catering to various needs. LDAP manages user authentication and authorization data across directory services, including Active Directory, while Kerberos serves authentication purposes within Windows operating system environments, seamlessly integrated with related services and applications. Alongside existing authentication clients (any server hosting a service ID password) and authentication servers (authenticating service ID passwords), this disclosure introduces an account manager to schedule password changes, a Kerberos (or LDAP) proxy service, a database for scheduled password changes, and a password vault. The account manager enables the proxy service to manage authentication requests, facilitating the manipulation of request message elements (e.g., swapping request message elements) to authenticate users by decrypting and re-encrypting the message elements as needed to prove possession of a password and thereby authenticate.

In one aspect, the present disclosure offers a software solution that relies on a Kerberos proxy server and a companion proxy-registry database indicating all required scheduled password changes for each application server. An account manager (e.g., an identity security platform such as SailPoint) coordinates the password changes step-by-step across a growing subset of servers in the domain. The account manager updates a password change scheduler database (e.g., proxy-registry database) and expects that the password is also changed either manually or automatically on the subset of scheduled application servers. The authentication proxy (e.g., Kerberos proxy) has access to the password change scheduler proxy-registry database and a password vault with both old and new passwords for the service account. The proxy server can therefore manipulate the Kerberos (or LDAP) messages and proceed with the password change inside the Kerberos messages, replacing the proof of possession of new password (provided with the application) with the proof of possession of the old password. The proxy server therefore allows simultaneous use of both passwords for the same account until all servers are updated with the new password. At this point the authentication service account repository (e.g., Active Directory [AD]) can be updated with the new service ID password and the password change scheduler database record for the service ID can be deleted. The proxy server will allow all authentication requests to pass through untouched.

According to solutions offered by this disclosure, the password change scheduler database operates in coordination with a proxy server to enable the scope of password changes for a single service account ID to grow from one application server to a full set of application servers across multiple applications hosting the service ID. The complete password change period can progressively last during multiple weeks or months, updating passwords in incremental server subsets without breaking applications.

Turning now to the figures, FIG. 1 illustrates an authentication proxy system 100 for password rotation, according to at least one aspect of the present disclosure. In one aspect, the authentication proxy system 100 comprises an active directory (AD) controller 104 that interfaces with an application server 102 (which is representative of a plurality of application servers), an active directory 120 (AD), and an account manager 118. The active directory (AD) controller 104 comprises a proxy server 110 in communication with a proxy-registry database 112 and an authentication service 114.

The proxy server 110 and companion proxy-registry database 112 indicate all required scheduled password changes for an application server 102, which may be one of a plurality of application servers that interface with the proxy server 110. The proxy server 110 can therefore manipulate messages and proceed with password changes inside the messages, replacing proof of possession of a new service ID password (provided with the application) with proof of possession of the old service ID password. The proxy server 110 allows all authentication requests to pass through untouched and therefore allows simultaneous use of both old and new service ID passwords for the same account until all application servers 102 are updated with a new service ID password. At this point the authentication service account repository active directory 120 can be updated with the new service ID password and the record of the old service ID password can be deleted from the proxy-registry database 112 by the account manager 118. In one aspect, the proxy server 110 may be a Kerberos Key Distribution Client Proxy (KKDCP). The proxy-registry database 112 of required password changes is managed by the account manager 118 and stores the application server 102/IP, the service ID, the old service ID password version (valid in the active directory 120), the new service ID password version (valid on the client 106), and the validity period, among other parameters.

In one aspect, the authentication service 114 may be an Active Directory LDAP or Kerberos Key Distribution Center (KDC) domain authentication service to manage user authentication and authorization data across directory services, including the active directory 120.

In one aspect, the account manager 118 enables the proxy server 110 to manage authentication requests from application servers 102 hosted by the one or more application servers 102, facilitating the manipulation (e.g., swapping) of request message elements to authenticate users by decrypting and re-encrypting as needed to prove the possession of a password and thereby authenticate the application server 102. The account manager 118 schedules password changes and updates the proxy-registry database 112 of scheduled password changes. The account manager 118 interfaces with a password vault 116. The account manager 118 coordinates the password changes step-by-step across a growing subset of application servers 102 in the domain. The account manager 118 updates the proxy-registry database 112 (e.g., password change scheduler database) and expects that the password can be changed manually or automatically on the subset of scheduled application servers 102. The authentication proxy server 110 (e.g., Kerberos proxy) has access to the password change scheduler proxy-registry database 112 and a password vault 116 with both old and new passwords for the service account. In one aspect, the account manager 118 may be an identity security platform provide by SailPoint Technologies, for example.

In one aspect, the password vault fetches encrypted account passwords from the account manager 118 and receives new account ID passwords from the account manager 118. The authentication proxy server 110 has access to the password change scheduler proxy-registry database 112 and the password vault 116, which stored both old and new passwords for the service account. The password vault 116 updates the Keytab files 108 for applications served by the application server 102. The password vault 116 may be an enterprise random password manager (ERPM) service account.

The application server 102 hosts a Kerberos client 106, which is consistently redirected to the proxy server 110. When password change requests (CRQs) occur, the proxy server 110 verifies the password's accuracy and updates it with an authorized and valid version if necessary. The password vault 116 facilitates password changes in the active directory 120 and securely delivers passwords to the proxy server 110. The password vault 116 can update the Keytab files 108 as they are processed locally on the Kerberos client 106. This process adheres to a standard Kerberos protocol.

After discussing one aspect of the authentication proxy system 100 architecture, we'll outline a process flow for password rotation. This process involves the active directory 120 and the proxy server 110 working together to automate password updates within the authentication proxy system 100. The proxy server 110 can access the proxy-registry database 112 of required password changes. The process flow initiates by updating (1) an old service ID password on the application server 102. The account manager 118 updates (1.1) the proxy-registry database 112 of required password changes and generates a new service ID password version for the service ID and updates (1.2) the passwords in the password vault 116. During a password change request (1.3) the application on the application server 102 will be updated with the new service ID password version. The application password may be updated manually or automatically by the password vault 116.

When the application server 102 initiates an authentication (2) with a new service ID password, the proxy server 110 intercepts messages from the application server 102 and determines (3) if a password change is required (e.g., service ID, domain, version, and rotates the message elements when necessary). If the proxy server 110 determines that a password change is needed, the proxy server 110 replaces the message elements encrypted with the new service ID password, decrypts them, and re-encrypts them with the old service ID password. The proxy server 110 queries (3.1) the proxy-registry database 112 of required password changes to determine if the application server 102 needs a password change and returns the old and new service ID password references. If a password rotation is needed, the proxy server 110 obtains (3.2) the hashes from the password vault 116 (or obtains the clear text version and hashes it locally). The hashing algorithm and salt may be those setup for use by the payment network KDC but can (should) be discovered in the Abstract Syntax Notation One (ASN.1) parsing as defined in the standard interface description language (IDL) for defining data structures. In one aspect, the proxy server 110 may utilize a C language ASN.1 parser to identify and manipulate the message elements. In one aspect, the initial client authentication request message may be combined with a timestamp and encrypted with the client password hash. This message also is transformed during the password change process.

The proxy server 110 then proceeds with message transformation (e.g., using hash based keys for decryption, re-encryption of all password-based message elements). Once the message is transformed, it is forwarded (4) to the authentication service 114. The authentication service 114 obtains (5) the old service ID password hash that is still in the active directory 120, to validate the transformed message. Passwords are not exchanged in the Kerberos protocol. Instead, Kerberos uses the password hash as the message symmetric encryption key.

After completing the password rotation process and ensuring that all client applications hosted on all application servers 102 relying on the service ID have updated their passwords from the old service ID passwords to new service ID passwords, the account manager 118 proceeds to remove (6.1) the corresponding change record from the proxy-registry database 112. Simultaneously, the account manager 118 updates (6.2) the old service ID password in the active directory 120 with the new service ID password.

In cases where the client application lacks the correct version of the service ID password, the proxy server 110 requires information about the client application version (identified by a client ID). With this knowledge, the proxy server 110 computes password hashes based on both the application server 102 and the client application versions. These hashes are then utilized to decrypt and re-encrypt the message, enabling validation of the password's correctness. Subsequently, the proxy server 110 re-encrypts the message using another hash from a different password, ensuring that the authentication service 114 can verify its validity.

FIGS. 2-5 illustrate the authentication proxy system 100 for password rotation shown in FIG. 1 over four phases of the password rotation process in a Kerberos implementation, according to at least one aspect of the present disclosure. In FIGS. 2-5, KKDCP proxy server 110 capable of automating the password update/rotation process acts as a front end to the active directory 120. The application server 102 has a Kerberos client 106 that is permanently redirected to the KKDC proxy server 110. During CRQs, the proxy server 110 checks if the password is correct and updates the password with an authorized and valid version if not valid. Keytab files 108, 124 are processed locally on the Kerberos client 106 and communicates with the proxy server 110 over a Kerberos protocol. The Kinit 122 command obtains or renews a Kerberos ticket-granting ticket.

FIG. 2 illustrates an activate/setup phase of the authentication proxy system 100 for password rotation shown in FIG. 1, according to at least one aspect of the present disclosure. The Kerberos client 106 communicates with the proxy server 110 through the Kerberos protocol. Upon receiving authorization (1) for a password change, a new Account ID and password change Period, the account manager 118 processes the request, generating (2) a new Account ID password. The password vault 116 than retrieves (3) encrypted account passwords from the account manager 118. Subsequently, the account manager 118 updates (4) authorized Account IDs, and password rotation periods, along with encrypted passwords in the proxy-registry database 112. The password vault 116 facilitates manually updating Keytab updates. As shown, the Keytab files 108 and the active directory 120 include the old service ID password.

FIG. 3 illustrates an activate/setup Keytab phase of the authentication proxy system 100 for password rotation shown in FIG. 1, according to at least one aspect of the present disclosure. As shown, the password vault 116 generates (5) a new Keytab file 124 with a new password and replaces the old Keytab files 108 (FIGS. 1 and 2).

FIG. 4 illustrates an authenticate with new password phase of the authentication proxy system 100 for password rotation shown in FIG. 1, according to at least one aspect of the present disclosure. The Kerberos client 106 requests (6) authentication with a new service ID password from the proxy server 110. Subsequently, the proxy server 110 executes a password change in the proxy-registry database 112.

FIG. 5 illustrates a terminate password rotation period phase of the authentication proxy system 100 for password rotation shown in FIG. 1, according to at least one aspect of the present disclosure. After completing the password rotation process and ensuring that all client applications hosted on all application servers 102 relying on the service ID have updated their passwords from the old service ID passwords to new service ID passwords, the account manager 118 proceeds to remove (8) the authorized account ID from the proxy-registry database 112. Simultaneously, the account manager 118 updates (9) the old service ID password in the active directory 120 with the new service ID password.

FIG. 6 illustrates a method 200 for rotating a password executed on the authentication proxy system 100 for password rotation shown in FIG. 1, according to at least one aspect of the present disclosure. The method 200 will be described in conjunction with the authentication proxy system 100 for password rotation shown in FIG. 1. With reference now to FIG. 2 together with FIG. 1, according to the method 200 a proxy server 110 receives 202 a first service ID password from an application server 102. The proxy server 110 determines 204 whether to use the first service ID password to authenticate the application server 102 at an authentication service 114 based on a query of a database 112 of password changes. If the proxy server 110 determines to utilize the first service ID password for authenticating the application server 102 at an authentication service 114, the method 200 follows the affirmative (YES) branch, where the authentication service 114 authenticates 206 the application server 102 using the first service ID password. If the proxy server 110 determines to not utilize the first service ID password for authenticating the application server 102 at an authentication service 114, the method 200 follows the negative (NO) branch, where authentication service 114 authenticates 208 the application server 102 by replacing the first service ID password with a second service ID password.

In one aspect of the method 200, the proxy server 110 passes the first service ID password or the second service ID password to the authentication service 114 for authenticating the application server 102 at the authentication service 114.

In one aspect of the method 200 the authentication service 114 authenticates the application server 102 at an active directory 120.

In one aspect of the method 200, the proxy server 110 determines whether an application server 102 of a plurality of application servers has been updated to the second service ID password. The proxy server 110 replaces the second service ID password with the first service ID password based on the determination that the application server 102 has been updated with the second service ID password. Subsequently, the proxy server 110 passes the first service ID password represented by an encryption key to the authentication service 114. The application server 102 is authenticated at the authentication service 114 based on the first service ID password until each one of the plurality of application servers 102 has been updated to the second service ID password.

In one aspect of the method 200, the proxy server 110 determines whether an application server 102 of a plurality of application servers has been updated to the second service ID password. The proxy server 110 replaces the first service ID password with the second service ID password based on the determination that the application server 102 has not been updated to the second service ID password. Subsequently, the proxy server 110 passes the first service ID password represented by an encryption key to the authentication service.

In one aspect of the method 200, the proxy server 110 receives a hash of the first service ID password and a hash of the second service ID password from a password vault 116 if a change is required. Subsequently, the proxy server 110 passes the hash of the second service ID password to the authentication service 114.

Each of the components of the authentication proxy system 100 for password rotation shown in FIG. 1 may be implemented as a computer apparatus 300 shown in FIG. 7 and described below. The authentication proxy system 100 for password rotation shown in FIG. 1 may be implemented as an example computer system 400 shown in FIG. 8 and is described below immediately after the description of FIG. 7.

FIG. 7 is a block diagram of a computer apparatus 300 with data processing subsystems or components, according to at least one aspect of the present disclosure. The subsystems shown in FIG. 7 are interconnected via a system bus 310. Additional subsystems such as a printer 318, keyboard 326, fixed disk 328 (or other memory comprising computer readable media), monitor 322, which is coupled to a display adapter 320, and others are shown. Peripherals and input/output (I/O) devices, which couple to an I/O controller 312 (which can be a processor or other suitable controller), can be connected to the computer system by any number of means known in the art, such as a serial port 324. For example, the serial port 324 or external interface 330 can be used to connect the computer apparatus to a wide area network such as the Internet, a mouse input device, or a scanner. The interconnection via system bus allows the central processor 316 to communicate with each subsystem and to control the execution of instructions from system memory 314 or the fixed disk 328, as well as the exchange of information between subsystems. The system memory 314 and/or the fixed disk 328 may embody a computer readable medium.

FIG. 8 is a diagrammatic representation of an example computer system 400 that includes a host machine 402 within which a set of instructions to perform any one or more of the methodologies discussed herein may be executed, according to at least one aspect of the present disclosure. In various aspects, the host machine 402 operates as a standalone device or may be connected (e.g., networked) to other machines. In a networked deployment, the host machine 402 may operate in the capacity of a server or a client machine in a server-client network environment, or as a peer machine in a peer-to-peer (or distributed) network environment. The host machine 402 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 400 includes the host machine 402, running a host operating system (OS) 404 on a processor or multiple processor(s)/processor core(s) 406 (e.g., a central processing unit (CPU), a graphics processing unit (GPU), or both), and various memory nodes 408. The host OS 404 may include a hypervisor 410 which is able to control the functions and/or communicate with a virtual machine ("VM") 412 running on machine readable media. The VM 412 also may include a virtual CPU or vCPU 414. The memory nodes 408 may be linked or pinned to virtual memory nodes or vNodes 416. When the memory node 408 is linked or pinned to a corresponding vNode 416, then data may be mapped directly from the memory nodes 408 to the corresponding vNode 416.

All the various components shown in host machine 402 may be connected with and to each other or communicate to each other via a bus (not shown) or via other coupling or communication channels or mechanisms. The host machine 402 may further include a video display, audio device or other peripherals 418 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 420 (also referred to as disk drive unit), and a network interface device 422. The host machine 402 may further include a data encryption module (not shown) to encrypt data. The components provided in the host machine 402 are those typically found in computer systems that may be suitable for use with aspects of the present disclosure and are intended to represent a broad category of such computer components that are known in the art. Thus, the system 400 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 424 also may be a Solid-state Drive (SSD), a hard disk drive (HDD) or other includes a computer or machine-readable medium on which is stored one or more sets of instructions and data structures (e.g., data/instructions 426) embodying or utilizing any one or more of the methodologies or functions described herein. The data/instructions 426 also may reside, completely or at least partially, within the main memory node 408 and/or within the processor(s) 406 during execution thereof by the host machine 402. The data/instructions 426 may further be transmitted or received over a network 428 via the network interface device 422 utilizing any one of several well-known transfer protocols (e.g., Hyper Text Transfer Protocol (HTTP)).

The processor(s) 406 and memory nodes 408 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 402 and that causes the host machine 402 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 402, with each server 430 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 402, with each server 430 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

Clause 1. A method for rotating a password, the method comprising: receiving, by a proxy server, a first service ID password from an application server; determining, by the proxy server, whether to use the first service ID password to authenticate the application server at an authentication service based on a query of a database of password changes; and one of: authenticating the application server at the authentication service using the first service ID password based on the determination; or authenticating the application server at the authentication service by replacing the first service ID password with a second service ID password based on the determination.

Clause 2. The method of clause 1, comprising passing, by the proxy server, the first service ID password or the second service ID password to the authentication service to authenticate the application server at the authentication service.

Clause 3. The method of any one of clauses 1-2, comprising authenticating, by the authentication service, the application server at an active directory.

Clause 4. The method of any one of clauses 1-3, comprising determining, by the proxy server, whether the application server of a plurality of application servers has been updated to the second service ID password.

Clause 5. The method of clause 4, comprising: replacing, by the proxy server, the second service ID password with the first service ID password based on the determination that the application server has been updated with the second service ID password; and passing, by the proxy server, the first service ID password represented by an encryption key to the authentication service.

Clause 6. The method of clause 5, comprising authenticating the application server at the authentication service based on the first service ID password until each one of the plurality of application servers has been updated to the second service ID password.

Clause 7. The method of clause 4, comprising: replacing, by the proxy server, the first service ID password with the second service ID password based on the determination that the application server has not been updated to the second service ID password; and passing, by the proxy server, the first service ID password represented by an encryption key to the authentication service.

Clause 8. The method of any one of clauses 1-7, comprising: receiving, by the proxy server, a hash of the first service ID password and a hash of the second service ID password from a password vault if a change is required; and passing, by the proxy server, the hash of the second service ID password to the authentication service.

Clause 9. A system, comprising: a proxy server; a proxy registry database of password changes; and an authentication service; wherein the proxy server is configured to: receive a first service ID password from an application server; determine whether to use the first service ID password to authenticate the application server at the authentication service based on a query of the proxy registry database of password changes; and one of: authenticate the application server at the authentication service using the first service ID password based on the determination; or authenticate the application server at the authentication service by replacing the first service ID password with a second service ID password based on the determination.

Clause 10. The system of clause 9, wherein the proxy server is configured to pass the first service ID password or the second service ID password to the authentication service to authenticate the application server at the authentication service.

Clause 11. The system of any one of clauses 9-10, wherein the authentication service is configured to authenticate the application server at an active directory.

Clause 12. The system of any one of clauses 9-11, wherein the proxy server is configured to determine whether the application server of a plurality of application servers has been updated to the second service ID password.

Clause 13. The system of clause 12, wherein the proxy server is configured to: replace the second service ID password with the first service ID password based on the determination that the application has been updated with the second service ID password; and pass the first service ID password to the authentication service.

Clause 14. The system of clause 13, wherein the authentication service is configured to authenticate the application server based on the first service ID password until each one of the plurality of application servers has been updated to the second service ID password.

Clause 15. The system of any of clauses 12-14, wherein the proxy server is configured to: replace the first service ID password with the second service ID password based on the determination that the application has not been updated to the second service ID password; and pass the first service ID password represented by an encryption key to the authentication service.

Clause 16. The system of any one of clauses 9-15, comprising: receiving, by the proxy server, a hash of the first service ID password and a hash of the second service ID password from a password vault if a change is required; and pass the hash of the second service ID password to the authentication service.

Clause 17. A computer program product comprising at least one non-transitory computer-readable medium including one or more instructions that, when executed by at least one processor, cause the at least one processor to: receive a first service ID password from an application server; determine whether to use the first service ID password to authenticate the application server at an authentication service based on a query of a proxy registry database of password changes; and one of: authenticate the application server at the authentication service using the first service ID password based on the determination; or authenticate the application server at the authentication service by replacing the first service ID password with a second service ID password based on the determination.

Clause 18. The computer program product of clause 17, wherein the one or more instructions, when executed by the at least one processor, cause the at least one processor to pass the first service ID password or the second service ID password to the authentication service to authenticate the application server at the authentication service.

Clause 19. The computer program product of any one of clauses 17-18, wherein the one or more instructions, when executed by at least one processor, cause the at least one processor to authenticate the application server at an active directory.

Clause 20. The computer program product of any one of clauses 17-19, wherein the one or more instructions, when executed by the at least one processor, cause the at least one processor to: determine whether an application server of a plurality of application servers has been updated to the second service ID password; and one of: replace the second service ID password with the first service ID password based on the determination that the application server has been updated with the second service ID password; pass the first service ID password represented by an encryption key to the authentication service; and authenticate the application server based on the first service ID password until each one of the plurality of application servers has been updated to the second service ID password; or replace the first service ID password with the second service ID password based on the determination that the application server has not been updated to the second service ID password; and pass the first service ID password represented by an encryption key to the authentication service.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively, or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively, or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively, or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted as being prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for rotating a password, the method comprising:

receiving, by a proxy server, a first service ID password from an application server;

determining, by the proxy server, whether to use the first service ID password to authenticate the application server at an authentication service based on a query of a database of password changes;

wherein based on the determination to use the first service ID password, authenticating the application server at the authentication service using the first service ID password based on the determination; and wherein based on the determination not to use the first service ID password, authenticating the application server at the authentication service by replacing the first service ID password with a second service ID password based on the determination.

2. The method of claim 1, comprising passing, by the proxy server, the first service ID password or the second service ID password to the authentication service to authenticate the application server at the authentication service.

3. The method of claim 1, comprising authenticating, by the authentication service, the application server at an active directory.

4. The method of claim 1, comprising determining, by the proxy server, whether the application server of a plurality of application servers has been updated to the second service ID password.

5. The method of claim 4, comprising:

replacing, by the proxy server, the second service ID password with the first service ID password based on the determination that the application server has been updated with the second service ID password; and passing, by the proxy server, the first service ID password represented by an encryption key to the authentication service.

6. The method of claim 5, comprising authenticating the application server at the authentication service based on the first service ID password until each one of a plurality of application servers has been updated to the second service ID password.

7. The method of claim 4, comprising:

replacing, by the proxy server, the first service ID password with the second service ID password based on the determination that the application server has not been updated to the second service ID password; and passing, by the proxy server, the first service ID password represented by an encryption key to the authentication service.

8. The method of claim 1, comprising:

receiving, by the proxy server, a hash of the first service ID password and a hash of the second service ID password from a password vault if a change is required; and passing, by the proxy server, the hash of the second service ID password to the authentication service.

9. A system, comprising:

a proxy server, the proxy server comprising a processor and a memory storage device having instruction stored thereon, that when executed, cause the processor to execute the instructions;

a proxy registry database of password changes; and an authentication service;

wherein the proxy server is configured to:

receive a first service ID password from an application server;

determine whether to use the first service ID password to authenticate the application server at the authentication service based on a query of the proxy registry database of password changes;

wherein based on the determination to use the first service ID password, authenticate the application server at the authentication service using the first service ID password based on the determination; and wherein based on the determination not to use the first service ID password, authenticate the application server at the authentication service by replacing the first service ID password with a second service ID password based on the determination.

10. The system of claim 9, wherein the proxy server is configured to pass the first service ID password or the second service ID password to the authentication service to authenticate the application server at the authentication service.

11. The system of claim 9, wherein the authentication service is configured to authenticate the application server at an active directory.

12. The system of claim 9, wherein the proxy server is configured to determine whether the application server of a plurality of application servers has been updated to the second service ID password.

13. The system of claim 12, wherein the proxy server is configured to:

replace the second service ID password with the first service ID password based on the determination that the application server has been updated with the second service ID password; and pass the first service ID password represented by an encryption key to the authentication service.

14. The system of claim 13, wherein the authentication service is configured to authenticate the application server based on the first service ID password until each one of a plurality of application servers has been updated to the second service ID password.

15. The system of claim 12, wherein the proxy server is configured to:

replace the first service ID password with the second service ID password based on the determination that the application server has not been updated to the second service ID password; and pass the first service ID password represented by an encryption key to the authentication service.

16. The system of claim 9, comprising:

receiving, by the proxy server, a hash of the first service ID password and a hash of the second service ID password from a password vault if a change is required; and pass the hash of the second service ID password to the authentication service.

17. A computer program product comprising at least one non-transitory computer-readable medium including one or more instructions that, when executed by at least one processor, cause the at least one processor to:

receive a first service ID password from an application server;

determine whether to use the first service ID password to authenticate the application server at an authentication service based on a query of a proxy registry database of password changes;

wherein based on the determination to use the first service ID password, authenticate the application server at the authentication service using the first service ID password based on the determination; and wherein based on the determination not to use the first service ID password, authenticate the application server at the authentication service by replacing the first service ID password with a second service ID password based on the determination.

18. The computer program product of claim 17, wherein the one or more instructions, when executed by the at least one processor, cause the at least one processor to pass the first service ID password or the second service ID password to the authentication service to authenticate the application server at the authentication service.

19. The computer program product of claim 17, wherein the one or more instructions, when executed by at least one processor, cause the at least one processor to authenticate the application server at an active directory.

20. The computer program product of claim 17, wherein the one or more instructions, when executed by the at least one processor, cause the at least one processor to:

determine whether the application server has been updated to the second service ID password; and one of:

replace the second service ID password with the first service ID password based on the determination that the application server of a plurality of application servers has been updated with the second service ID password; pass the first service ID password represented by an encryption key to the authentication service; and authenticate the application server based on the first service ID password until each one of a plurality of application servers has been updated to the second service ID password; or replace the first service ID password with the second service ID password based on the determination that the application server of a plurality of application servers has not been updated to the second service ID password; and pass the first service ID password represented by an encryption key to the authentication service.

* * * * *